United States Patent
Gimat et al.

(10) Patent No.: US 10,781,708 B2
(45) Date of Patent: Sep. 22, 2020

(54) GUIDE VANE MADE FROM COMPOSITE MATERIAL, COMPRISING STAGGERED ATTACHMENT FLANGES FOR A GAS TURBINE ENGINE

(71) Applicant: SAFRAN AIRCRAFT ENGINES, Paris (FR)

(72) Inventors: Matthieu Gimat, Moissy-Cramayel (FR); François Charleux, Bordeaux (FR); Sébastien Marin, Portsmouth, NH (US); Gwenael Marion, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 552 days.

(21) Appl. No.: 15/506,993

(22) PCT Filed: Aug. 18, 2015

(86) PCT No.: PCT/FR2015/052219
§ 371 (c)(1),
(2) Date: Feb. 27, 2017

(87) PCT Pub. No.: WO2016/030608
PCT Pub. Date: Mar. 3, 2016

(65) Prior Publication Data
US 2017/0276005 A1    Sep. 28, 2017

Related U.S. Application Data

(60) Provisional application No. 62/042,056, filed on Aug. 26, 2014.

(51) Int. Cl.
*F01D 9/04*       (2006.01)
*F01D 5/28*       (2006.01)
(Continued)

(52) U.S. Cl.
CPC .............. *F01D 9/042* (2013.01); *F01D 5/282* (2013.01); *F01D 9/02* (2013.01); *F04D 29/542* (2013.01);
(Continued)

(58) Field of Classification Search
CPC . F01D 9/042; F01D 9/02; F01D 5/282; F04D 29/542; Y02T 50/672; Y02T 50/673; F05D 2300/603
See application file for complete search history.

(56) References Cited

U.S. PATENT DOCUMENTS 6,409,472 B1 *   6/2002   McMahon ............ F01D 5/3023
                                                                  415/119
6,595,747 B2 *   7/2003   Bos ........................ F01D 9/042
                                                                  415/209.2
(Continued)

FOREIGN PATENT DOCUMENTS

JP      2010-229006 A    10/2010
JP      2012-530212 A    11/2012
(Continued)

OTHER PUBLICATIONS

International Search Report as issued in International Patent Application No. PCT/FR2015/052219, dated Oct. 30, 2015.

*Primary Examiner* — David Hamaoui
(74) *Attorney, Agent, or Firm* — Pillsbury Winthrop Shaw Pittman LLP

(57) ABSTRACT

A composite material guide vane for a gas turbine engine, the composite material including fiber reinforcement densified by a matrix, the fiber reinforcement being formed as a single piece by three-dimensional weaving and including an airfoil and at least two fastener flanges extending from a
(Continued)

radial end of the vane towards opposite side faces of the airfoil, the fastener flanges being axially offset from each other.

7 Claims, 1 Drawing Sheet

(51) Int. Cl.
*F01D 9/02* (2006.01)
*F04D 29/54* (2006.01)

(52) U.S. Cl.
CPC ....... *F05D 2300/603* (2013.01); *Y02T 50/672* (2013.01); *Y02T 50/673* (2013.01)

(56) References Cited

U.S. PATENT DOCUMENTS

| | | | | |
|---|---|---|---|---|
| 6,648,597 | B1* | 11/2003 | Widrig | C04B 37/001 |
| | | | | 415/200 |
| 7,753,653 | B2* | 7/2010 | Cairo | F04D 29/023 |
| | | | | 415/200 |
| 8,888,451 | B2* | 11/2014 | Falk | B23P 15/04 |
| | | | | 415/209.3 |
| 9,427,834 | B2* | 8/2016 | Fremont | B29B 11/16 |
| 9,506,355 | B2* | 11/2016 | Nunez | F01D 5/282 |
| 9,708,918 | B2* | 7/2017 | Fremont | F01D 5/282 |
| 10,131,073 | B2* | 11/2018 | Gimat | F01D 5/146 |
| 10,190,426 | B2* | 1/2019 | Fremont | F01D 9/042 |
| 10,240,466 | B2* | 3/2019 | Podgorski | B29C 70/48 |
| 2003/0185673 | A1 | 10/2003 | Matsumoto et al. | |
| 2005/0254942 | A1* | 11/2005 | Morrison | F01D 5/282 |
| | | | | 415/200 |
| 2011/0293828 | A1* | 12/2011 | Eberling-Fux | B29B 11/16 |
| | | | | 427/249.2 |
| 2012/0057985 | A1* | 3/2012 | Tanahashi | F01D 5/282 |
| | | | | 416/241 B |
| 2012/0099982 | A1* | 4/2012 | Coupe | F01D 9/04 |
| | | | | 415/200 |
| 2013/0087955 | A1 | 4/2013 | Plante et al. | |
| 2013/0108422 | A1 | 5/2013 | Coupe et al. | |
| 2016/0245103 | A1* | 8/2016 | Gimat | F01D 25/005 |

FOREIGN PATENT DOCUMENTS

| | | |
|---|---|---|
| JP | 2013-527815 A | 7/2013 |
| WO | WO 2006/136755 A2 | 12/2006 |
| WO | WO 2013/079859 A1 | 6/2013 |
| WO | WO 2013/079860 A1 | 6/2013 |
| WO | WO 2014/037675 A1 | 3/2014 |

* cited by examiner

GUIDE VANE MADE FROM COMPOSITE MATERIAL, COMPRISING STAGGERED ATTACHMENT FLANGES FOR A GAS TURBINE ENGINE

CROSS REFERENCE TO RELATED APPLICATIONS

This application is the U.S. National Stage of PCT/FR2015/052219 filed Aug. 18, 2015, which in turn claims priority to U.S. Application No. 62/042,056, filed Aug. 26, 2014. The contents of both applications are incorporated herein by reference in their entirety.

BACKGROUND OF THE INVENTION

The present invention relates to the general field of guide vanes for a gas turbine aeroengine.

Examples of applications of the invention include in particular outlet guide vanes (OGV), inlet guide vanes (IGV), and variable stator vanes (VSV) for an aviation turbine engine.

Typically, each guide vane of a gas turbine aeroengine presents an airfoil that is fastened at each radial end to a shroud by means of fastener flanges. Such guide vanes form rows of stator vanes that serve to guide the stream of gas flowing through the engine to impart an appropriate speed and angle to the stream.

Guide vanes are generally made of metal, but it is becoming common practice to make them out of composite material, in particular in order to reduce their weight. In particular, it is known to make guide vanes from fiber reinforcement obtained by three-dimensional weaving, and in which the airfoil and the fastener flanges form a single piece. For this purpose, the fastener flanges are typically formed by non-interlinking in the main preform (constituting the airfoil preform) so as to form two distinct portions, one of the portions constituting a preform for a fastener flange on the pressure side (i.e. a flange that is folded towards the pressure side face of the airfoil), and the other portion constituting a preform for a suction side fastener flange (i.e. a flange folded towards the suction side face of the airfoil).

Such a method of fabrication presents certain drawbacks. In particular, that method leads to major weaving constraints since it is necessary to have some minimum number of layers of strands in order to make it possible to create the non-interlinked portions. Furthermore, it is difficult to mange the variations in the thickness of the fiber preform. Specifically, having two non-interlinked portions implies that only half as many layers of strands are available in these non-interlinked zones for creating regressivity of thickness, which leads to greater movements at the outlets of the layers or makes it necessary to have recourse to artifices of weaving (such as duplicating strands) in order to smooth out these variations of thickness. Finally, that method of fabrication requires the use of fillers woven specially to be received in the opening of the non-interlinking so as to fill in the void and reduce stresses at the end of the non-interlinking.

OBJECT AND SUMMARY OF THE INVENTION

A main object of the present invention is thus to provide a guide vane that does not present the above-described drawbacks.

In accordance with the invention, this object is achieved by a composite material guide vane for a gas turbine engine, the composite material comprising fiber reinforcement densified by a matrix, the fiber reinforcement being formed as a single piece by three-dimensional weaving and comprising an airfoil and at least two fastener flanges extending from a radial end of the vane towards opposite side faces of the airfoil, said fastener flanges being axially offset from each other.

The guide vane of the invention is remarkable in that it presents fastener flanges that are axially offset from one another. With such an architecture, there is no need to make provision for non-interlinking in the fiber preform in order to obtain the fastener flanges. It is thus possible to avoid the drawbacks inherent to fabrication methods that have recourse to the use of non-linking for forming fastener flanges. Furthermore, the fabrication of such a guide vane requires a smaller quantity of layers of strands compared with the above-described fabrication methods, which represents a considerable saving in terms of weight and fabrication costs. Finally, this fabrication method does not require any fillers to be woven.

The guide vane may include two pairs of fastener flanges extending from a radially outer end of the airfoil and axially offset from each other.

The guide vane may equally include two fastener flanges extending from a radially inner end of the vane beside a leading edge of the airfoil. Under such circumstances, the guide vane may also further include two other fastener flanges extending from the radially inner end of the vane beside a trailing edge of the airfoil and axially level with each other.

The guide vane may also include, at each radial end, a fastener flange situated beside a leading edge of the airfoil and extending towards one side face of the airfoil, and a fastener flange situated beside a trailing edge of the airfoil and extending towards an opposite side face of the airfoil.

The invention also provides a method of fabricating a guide vane as defined above, the method comprising in succession: using three-dimensional weaving to prepare a fiber preform in a single piece constituting the preform of the airfoil and of the fastener flanges; cutting out the fiber preform to give it the outline of the portions constituting the airfoil and fastener flanges; shaping the cut-out preform by folding the portions constituting fastener flanges; shaping the preform in a mold; and densifying the preform with a resin.

The invention also provides a turbine engine including at least one guide vane as defined above.

BRIEF DESCRIPTION OF THE DRAWINGS

Other characteristics and advantages of the present invention appear from the following description made with reference to the accompanying drawing, which shows embodiments having no limiting character. In the figures.

DETAILED DESCRIPTION OF THE INVENTION

The invention applies to making guide vanes for a gas turbine aeroengine.

Non-limiting examples of such guide vanes include in particular outlet guide vanes (OGV), inlet guide vanes (IGV), and variable stator vanes (VSV), etc.

Figure 1:
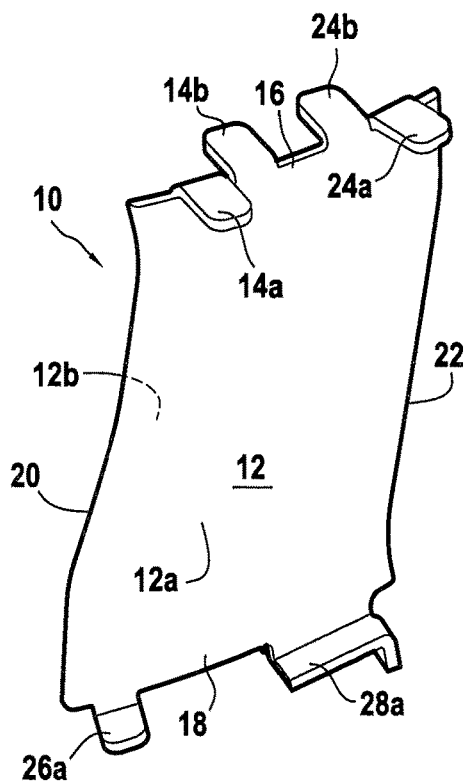
FIGS. 1 and 2 are diagrammatic views of a guide vane in accordance with the invention.
Figure 2:
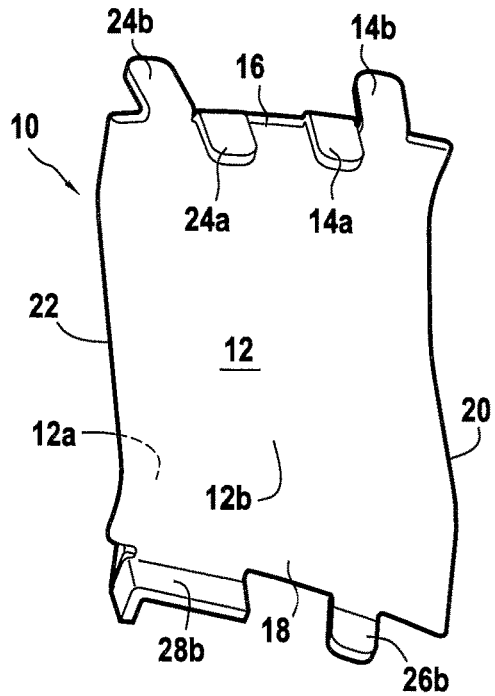

FIGS. 1 and 2 are diagrammatic perspective views of an example of such a guide vane 10 in accordance with the invention.

In accordance with the invention, this guide vane 10 is made of composite material with fiber reinforcement densified by a matrix, the fiber reinforcement being formed as a single piece of three-dimensional weaving comprising an airfoil 12 and at least two fastener flanges (or tabs) 14a and 14b for enabling the guide vane to be fastened to a shroud (an inner and/or outer shroud).

The airfoil 12 extends firstly radially between a radially outer end 16 and a radially inner end 18, and secondly axially between a leading edge 20 and a trailing edge 22.

More precisely, the fastener flanges 14a, 14b extend from one of the radial ends of the vane 16, 18 towards opposite side faces of the airfoil (namely the pressure side face 12a and the suction side face 12b of the airfoil 12).

Thus, in the example of FIGS. 1 and 2, the fastener flange 12a (referred to as the pressure side flange) extends on the pressure side 12a of the airfoil, while the fastener flange 14b (referred to as the suction side flange) extends on the suction side 12b of the airfoil.

Furthermore, these fastener flanges 14a and 14b are axially offset from each other, i.e. they are not level with each other in the axial direction (the direction in which the airfoil extends between its leading edge 20 and its trailing edge 22).

Furthermore, in the embodiment of FIGS. 1 and 2, the guide vane 10 has two pairs of fastener flanges 14a, 14b and 24a, 24b at the radially outer end 16 of the airfoil, which pairs are axially offset from each other and in each of them the fastener flanges are also axially offset from each other. These fastener flanges 14a, 14b and 24a, 24b are for enabling the guide vane to be fastened to an outer shroud.

Likewise, at its radially inner end 18, the guide vane 10 also has two other fastener flanges 26a and 26b that extend towards the pressure side and suction side faces 12a and 12b of the airfoil. These fastener flanges 26a and 26b are situated beside the leading edge 20 of the airfoil and are for enabling the guide vane to be fastened to an inner shroud.

In the embodiment shown in FIGS. 1 and 2, at this inner radial end 18, the guide vane 10 also has two axial fastener flanges 28a and 28b that are situated beside the trailing edge 22 of the airfoil and that are axially level with each other (unlike the fastener flanges 26a and 26b). These axial fastener flanges 28a and 28b also serve to fasten the guide vane to the inner shroud.

There follows a description of an example method of fabricating such a guide vane.

Figure 3:
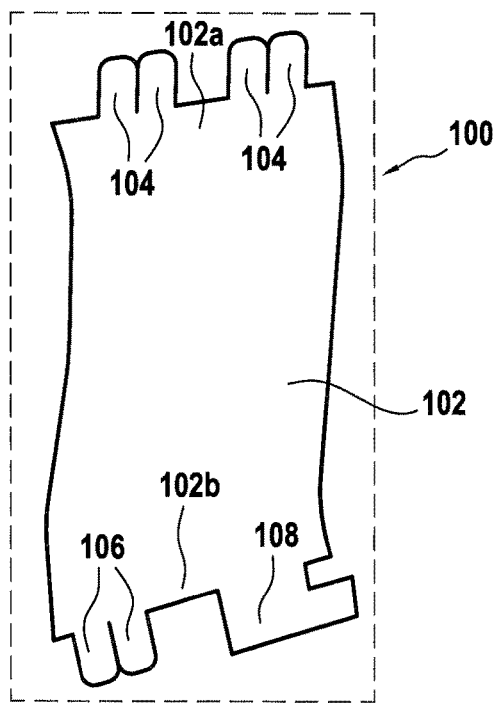
FIG. 3 is a flat view of a fiber preform used for fabricating the guide vane of FIGS. 1 and 2.

A first step of the fabrication method consists in using three-dimensional (3D) weaving to prepare a single-piece fiber preform constituting the preform for the airfoil and for the fastener flanges that are associated therewith (i.e. in this example, the fastener flanges 14a, 14b, 24a, 24b, 26a, 26b, and 28a, 28b). The outline of such a fiber preform is shown in dashed lines in FIG. 3.

The term "3D weaving" should be understood as meaning that the warp yarns follow sinuous paths in order to interlink weft yarns belonging to different layers of weft yarns, it being understood that 3D weaving, in particular using an interlock weave, may include 2D weaving at the surface. Various 3D weaves can be used, such as interlock, multi-satin, or multi-plain weaves, for example, as described in particular in Document WO 2006/136755.

The following step of the method consists in cutting out the fiber preform to give it the outline of the portions constituting the airfoil and the fastener flanges. By way of example, this cutting out is performed using a water jet and the result that is obtained is represented by the cut-out preform 100 drawn with a continuous line in FIG. 3.

The cut-out preform 100 thus has a portion 102 constituting the airfoil preform, four portions 104 constituting fastener flange preforms at a radially outer end 102a of the portion 102 constituting the airfoil preform, and, at the radially inner end 102b of the portion 102, two portions 106 constituting fastener flange preforms, and one portion 108 constituting a preform for axial fastener flanges.

The cut-out preform is then shaped, in particular by folding the portions 104 and 106 constituting fastener flanges. These portions are thus folded in alternation towards the pressure side and towards the side of the portion 102 constituting the airfoil preform. The portion 108 constituting the preform for the axial fastener flanges, it is initially the subject of non-interlinking during weaving of the fiber preform so as to enable it to be shaped by folding two non-interlinked portions respectively to the pressure side and to the suction side of the portion 102 constituting the airfoil preform.

The fiber preform that is obtained in this way is then dried and put into place in an injection mold. The matrix for forming the composite material guide vane as shown in FIGS. 1 and 2 is deposited in the fiber preform while maintaining the preform in a mold, at least until the preform has become rigid (or consolidated).

The nature of the matrix is selected as a function of the intended application, e.g. an organic matrix obtained in particular from a resin that is a precursor of a polymer material such as an epoxy, bismaleimide, or polyimide resin, or that is a precursor of a carbon matrix or of a ceramic matrix. For an organic matrix, the fiber preform may be impregnated with a composition containing the matrix precursor resin either prior to being shaped in tooling, or after being shaped, in which case impregnation is performed by way of example by infusion or by a resin transfer molding (RTM) type process. For a carbon or ceramic matrix, densification may be performed by chemical vapor infiltration (CVI) or by impregnating with a liquid composition containing a carbon or ceramic precursor resin and performing heat treatment to pyrolize or ceramize the precursor, which methods are themselves well known.

Figure 4:
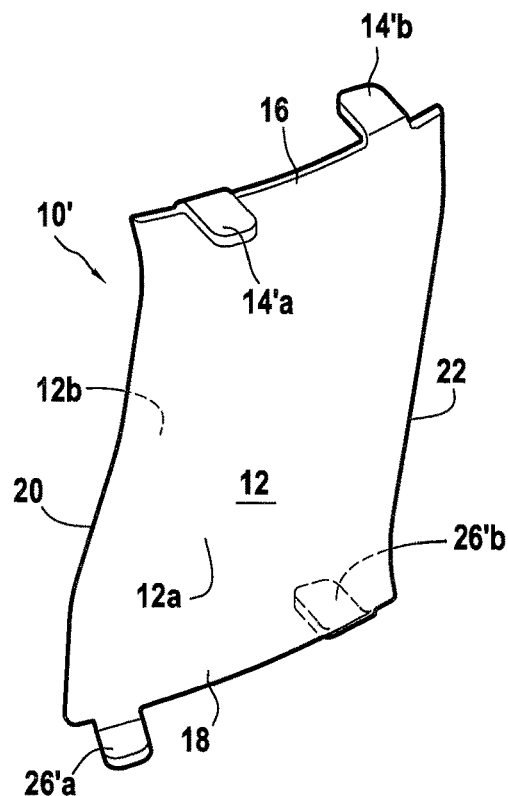
FIG. 4 is a diagrammatic view of a guide vane in a variant embodiment of the invention.

FIG. 4 shows a variant embodiment of a guide vane 10' of the invention.

This guide vane 10' differs from the above-described vane in that, at its radially outer end 16, it has only two fastener flanges 14'a and 14'b that are axially offset from each other, namely: a fastener flange 14'a situated beside the leading edge 20 of the airfoil and extending towards the pressure side face 12a of the airfoil, and a fastener flange 14'b that is situated beside the trailing edge 22 of the airfoil and that extends towards the suction side face 12b of the airfoil.

At its radially inner end 18, the guide vane 10' also has two fastener flanges 26'a and 26'b that are axially offset from each other, namely: a fastener flange 26'a that is situated beside the leading edge 20 of the airfoil and that extends towards the pressure side face 12a of the airfoil, and a fastener flange 26'b that is situated beside the trailing edge 22 of the airfoil and that extends towards the suction side face 12b of the airfoil.

Finally, it should be observed that this guide vane 10' does not have any fastener flanges that are in axial alignment with each other.

The invention claimed is:

1. A composite material guide vane for a gas turbine engine, the composite material comprising fiber reinforcement densified by a matrix, the fiber reinforcement being formed as a single piece by three-dimensional weaving and comprising an airfoil and at least two fastener flanges extending from a radial end of the vane towards opposite side faces of the airfoil, said fastener flanges being axially offset from each other and non-overlapping in the axial direction, wherein the at least two fastener flanges include two fastener flanges extending from a radially inner end of the vane beside a leading edge of the airfoil and towards the opposite side faces of the airfoil, said two fastener flanges being axially offset from each other and non-overlapping in the axial direction, wherein the guide vane is constructed and arranged to be directly mounted to the gas turbine engine, the at least two fastener flanges forming attachment elements for directly attaching the guide vane to a shroud of the gas turbine engine.

2. A guide vane according to claim 1, including two pairs of fastener flanges extending from a radially outer end of the airfoil and axially offset from each other.

3. A guide vane according to claim 1, further including two other fastener flanges extending from the radially inner end of the vane beside a trailing edge and axially level with each other.

4. A guide vane according to claim 1, including, at each radial end, a fastener flange situated beside a leading edge of the airfoil and extending towards one side face of the airfoil, and a fastener flange situated beside a trailing edge of the airfoil and extending towards an opposite side face of the airfoil.

5. A turbine engine including at least one guide vane according to claim 1.

6. A guide vane according to claim 1, wherein said at least two fastener flanges extending form the radial end of the vane are axially adjacent to each other.

7. A method of fabricating a guide vane according to claim 1, the method comprising in succession:

using three-dimensional weaving to prepare a fiber preform in a single piece constituting the preform of the airfoil and of the fastener flanges;

cutting out the fiber preform to give the fiber preform the outline of the portions constituting the airfoil and fastener flanges;

shaping the cut-out preform by folding the portions constituting fastener flanges;

shaping the preform in a mold; and densifying the preform with a resin.

* * * * *